United States Patent [19]
Ishizaki et al.

[11] Patent Number: 5,857,330
[45] Date of Patent: Jan. 12, 1999

[54] TRAVELLING CONTROL CIRCUIT FOR A HYDRAULICALLY DRIVEN TYPE OF TRAVELLING APPARATUS

[75] Inventors: Naoki Ishizaki; Toshiro Takano, both of Tochigi-ken, Japan

[73] Assignee: Komatsu Ltd., Tokyo, Japan

[21] Appl. No.: 765,259

[22] PCT Filed: Jun. 20, 1995

[86] PCT No.: PCT/JP95/01227

§ 371 Date: Dec. 20, 1996

§ 102(e) Date: Dec. 20, 1996

[87] PCT Pub. No.: WO95/35220

PCT Pub. Date: Dec. 28, 1995

[30] Foreign Application Priority Data

Jun. 21, 1994 [JP] Japan .................................. 6-138619

[51] Int. Cl.$^6$ .................................................. F15B 13/06
[52] U.S. Cl. .................. 60/426; 60/468; 91/447
[58] Field of Search ........................ 60/426, 468; 91/446, 91/447

[56] References Cited

U.S. PATENT DOCUMENTS

| | | | |
|---|---|---|---|
| 4,769,991 | 9/1988 | Johnson | 60/426 |
| 5,138,837 | 8/1992 | Obertrifter et al. | 60/426 |
| 5,251,444 | 10/1993 | Ochiai et al. | 60/426 |
| 5,259,192 | 11/1993 | Karakama et al. | 91/447 |
| 5,447,093 | 9/1995 | Budzich | 91/446 |
| 5,560,204 | 10/1996 | Ishihama et al. | 60/426 |
| 5,699,665 | 12/1997 | Coolidge | 91/447 |

FOREIGN PATENT DOCUMENTS

| | | |
|---|---|---|
| 1-176113 | 12/1989 | Japan . |
| 5-7289 | 2/1993 | Japan . |
| 5-82754 | 11/1993 | Japan . |
| 5-332310 | 12/1993 | Japan . |
| 6-138619 | 6/1994 | Japan . |
| 94/03343 | 2/1994 | WIPO . |

*Primary Examiner*—Sheldon J. Richter
*Attorney, Agent, or Firm*—Wenderoth, Lind & Ponack, L.L.P.

[57] ABSTRACT

A travelling control circuit for a hydraulically driven type of travelling apparatus is provided. The circuit has a hydraulic pump, left and right hand side directional control valves provided parallel to each other in a discharge path of the hydraulic pump, a left hand side first and second circuit and a right hand side first and second circuit. Furthermore, the output sides of the left hand side and right hand side directional control valves are connected with a left and right hand side travelling purpose hydraulic motor, respectively. In addition, a pressure compensating valve is provided with each of the first and second circuits to control the opening between an inlet port and an outlet port in response to a difference in pressure between a self load pressure and a maximum load pressure of the load pressures of the left and right hand side travelling purpose hydraulic motors, thereby compensating a pressure in the fluid. When the pressurized fluid is compensated, the pressure compensating valves establish communication between the left hand side and the right hand first circuits and between the left hand side and the right hand side second circuits. When communication between the inlet port an the outlet port is blocked or substantially blocked, the pressure compensating valves block communication between the left hand side and the right hand side first circuits and communication between the left hand side and the right hand side second circuits, respectively.

9 Claims, 6 Drawing Sheets

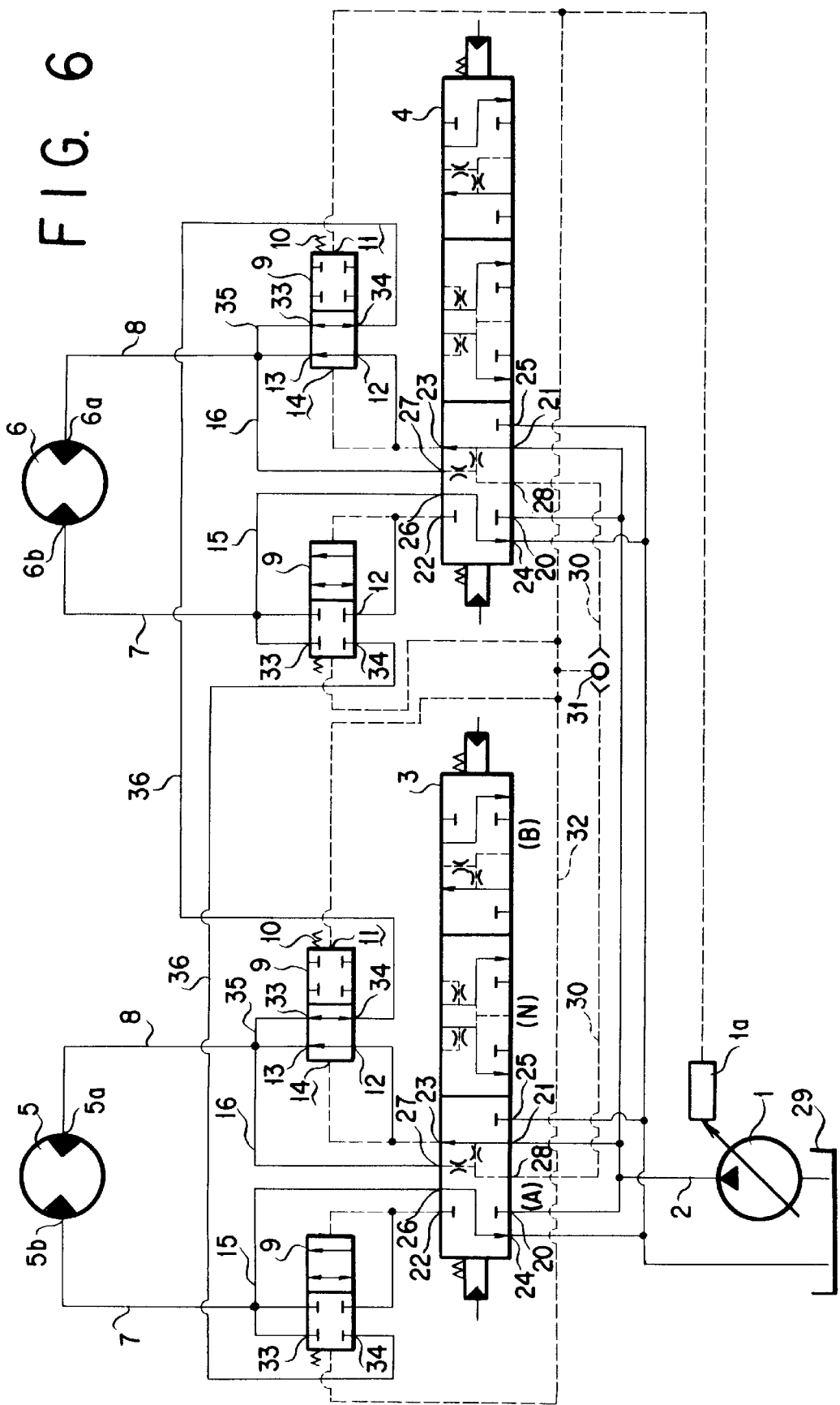

ated type of travelling apparatus is known in the prior art, as
TRAVELLING CONTROL CIRCUIT FOR A HYDRAULICALLY DRIVEN TYPE OF TRAVELLING APPARATUS

TECHNICAL FIELD

The present invention relates to a travelling control circuit for a hydraulically driven type of travelling control apparatus. In addition, the travelling control apparatus is for use in a construction machine and other similar types of equipment.

BACKGROUND ART

A hydraulically driven type of travelling apparatus is designed to be driven with a pair of hydraulic motors. The hydraulic motors are disposed at right and left hand sides for right and left hand side driving wheels, respectively. In addition, the hydraulic motors are for moving a vehicle. The right and left hand side traveling purpose hydraulic motors are supplied with a pressurized discharge fluid from a hydraulic pump, by right and left hand side directional control valves, respectively.

A travelling control circuit for such a hydraulically driven type of travelling apparatus is known in the prior art, as shown in FIG. 1, in which a single hydraulic pump is provided.

In such a travelling control apparatus, a hydraulic pump 1 has a discharge path 2 that is provided with a left hand side directional control valve 3 and a right hand side directional control valve 4 which are disposed in parallel to each other. A pair of first circuits 7 and a pair of second circuits 8, arranged at the left and right hand side, couple the left and right hand side directional control valves 3 and 4 with left and right hand side hydraulic motors 5 and 6. The hydraulic motors 5 and 6 are used for moving the machine. A pressure compensating valve 9 is provided in each of the first circuits 7 and each of the second circuits 8 to respond to the higher of load pressures of the left and right hand side hydraulic motors 5 and 6.

More specifically, each of the pressure compensating valves 9 is pushed in a direction to disconnect an inlet port 12 from an outlet port 13 by a spring 10 and by a maximum load pressure that acts on a first pressure receiving portion 11. Furthermore, each of the pressure compensating valves 9 may also be pushed in a direction to place the inlet port 12 into communication with the outlet port 13 under its own load pressure that acts on a second pressure receiving portion 14. Hence, the area of opening between the inlet port 12 and the outlet port 13 of each of the pressure compensating valves 9 will decrease as the difference between the maximum load pressure and its own load pressure is increased, thus compensating for a pressure in the inlet side.

Since this causes the pressurized discharge fluid from a single hydraulic pump to be supplied simultaneously to the left and right hand side hydraulic motors 5 and 6 while also compensating for a pressure with the pressure compensating valves 9, a pressurized discharge fluid can be supplied to the left hand side hydraulic motor 5 and the right hand side hydraulic motor 6 even if the left and right hand side traveling purpose hydraulic motors 5 and 6 have different load pressures.

At this point, it should be noted that a first auxiliary circuit 15 and a second auxiliary circuit 16 are each designed to control communication between the outlet port side of the pressure compensating valve 9 and a reservoir port of the left and right hand side directional control valves 3 and 4. Also, it should be noted that a capacity control unit 1a is provided for controlling the capacity of the hydraulic pump 1 in accordance with a load pressure.

Assume now that the foregoing travelling control arrangement is adopted. Then, if the left and right hand directional control valves 3 and 4 are switched to the first position A as shown in FIG. 2, to travel linearly, and if the supply flows to the left and right hand travelling purpose hydraulic motors 5 and 6 are different, the apparatus will travel in a curve. Then, as shown in FIG. 1. it is configured that the left and right hand side first circuits 7 and the left and right hand side second circuits 8 are each short circuited with a short circuit path 17. Each short circuit path 17 is provided with a travelling communicating path 18. The travelling communicating paths have communicating positions a which supply an identical flow quantity to the left hand side and the right hand side travelling purpose hydraulic motors 5 and 6 at the time of linear movement. When the travelling hydraulic motors 5 and 6 are turning leftwards and rightwards the travelling communicating valves 18 take the blocking positions.

In such a travelling control circuit, the pair of travelling communicating valves are required and costs are increased.

In such a travelling control circuit, it should also be noted that it is necessary for each of the travelling communicating valves 18 and 18 to switch between the communicating position a and the blocking position b synchronously with the switching operation of the directional control valves 3 and 4.

For this reason, it has been suggested to control the traveling communication valve 18 by a pressure acting on its pressure receiving portion 18a and also to couple a pilot pressure supply circuit 19 to the pressure receiving portion 18a and to the respective pressure receiving portions 3a and 4a of the left and right hand side directional control valve 3 and 4. Accordingly, in addition to the pair of short circuit paths 17 and 17, the four pilot pressure supply circuits 19 are also needed thus complicating the entire circuit.

In view of the foregoing problems, it is the object of the present invention to provide a travelling control circuit for a hydraulically driven type of travelling apparatus where the two travelling communication valves are unnecessary, thus decreasing costs, and where a pilot pressure fluid supply is unnecessary, thus simplifying the entire circuit.

SUMMARY OF THE INVENTION

In order to achieve the object mentioned above, there is provided in accordance with the present invention, a travelling control circuit for a hydraulically driven type of travelling apparatus, having a hydraulic pump, left and right hand side directional control valves, left hand side first and second circuits, right hand side first and second circuits, left and right hand side hydraulic motors, and pressure compensating valves. The left and right hand side directional control valves are parallel to each other in a discharge path of the hydraulic pump. The respective output sides of the left hand and right side directional control valves are connected to a left and right hand side travelling purpose hydraulic motor, respectively. The pressure compensating valves are provided with each of the first circuits and each of the second circuits for controlling an area of opening between an inlet port and an outlet port in response to a difference in pressure between a self load pressure and a maximum load pressure of the load pressures of the left hand side and right hand side travelling purpose hydraulic motors. Thus, the pressure compensating valves compensate for a pressure in the fluid.

When the pressurized fluid is compensated for, the pressure compensating valves function to open communication, via respective paths of communication, between the left hand side and the right hand side first circuits and between the left hand side and the right hand side second circuits. In addition when communication between the inlet port and the outlet port is blocked or substantially blocked, the pressure compensating valves block communication between the left hand side and the right hand side first circuits and communication between the left hand side and right hand side second circuits, respectively.

According to the configuration mentioned above, it will be seen that communication can be established between the left hand side and the right hand side first circuits as well as between the left hand side and right hand side second circuits. The communication is facilitated by virtue of the pressure compensating valve that is provided in either of the first and second circuits when a left and right hand side travelling purpose hydraulic motor are supplied with a pressurized fluid to drive the travelling apparatus along a linear path. It follows, therefore, that a linear path of travel of the apparatus can be enhanced owing to the fact that an identical amount of pressurized fluid is supplied to the left hand side travelling purpose hydraulic motor and the right hand side travelling purpose hydraulic motor.

It can accordingly be seen that since a pair of travelling purpose valves of communication are unnecessary, the cost of the apparatus will be reduced. In addition since a circuit tailored for a pilot pressure fluid is unnecessary, the circuit system is simplified.

Also, in the construction mentioned above, it is preferred that each of the pressure compensating valves should have a valve body, a bore, a valve, and a piston.

A bore is formed in the valve body and has a first port and a second port for establishing communication between the inlet port and the outlet port and between a load pressure introducing port and the outlet port.

The valve is adapted to be slidably inserted into the bore for establishing and blocking communication between the inlet port and the outlet port. Furthermore, the valve is capable of being pushed in a direction of communication by pressure from the inlet port.

The piston is adapted to be slidably inserted into the bore and is capable of thrusting, by pressure from the load pressure introducing port and by a resilient spring, the valve into its blocking position. Further, the piston is capable of being pushed in the other direction by the valve.

The piston should be configured so that when it is displaced, or substantially displaced, in the first direction, it will block communication between the first port and the second port. Conversely, when it has been pushed a predetermined distance in the second direction, it may establish communication between the first port and the second port.

Furthermore, it is desirable to have a passage of communication formed in the piston for establishing communication between the first port and the second port whenever communication is to be established.

BRIEF EXPLANATION OF THE DRAWINGS

The present invention will better be understood from the following detailed description and the drawings attached hereto showing certain illustrative embodiments of the present invention. In this connection, it should be noted that such embodiments as illustrated in the accompanying drawings are intended in no way to limit the present invention, but to facilitate an explanation and understanding thereof.

In the accompanying drawings:

FIG. 6 is a diagrammatic view showing a state of linear travel in the embodiment of FIG. 3.

DETAILED DESCRIPTION OF THE PREFERRED EMBODIMENTS

Suitable embodiments of the present invention with respect to a travelling control circuit of a hydraulically driven type of travelling apparatus will now be set forth with reference to the accompanying drawings.

Figure 1:
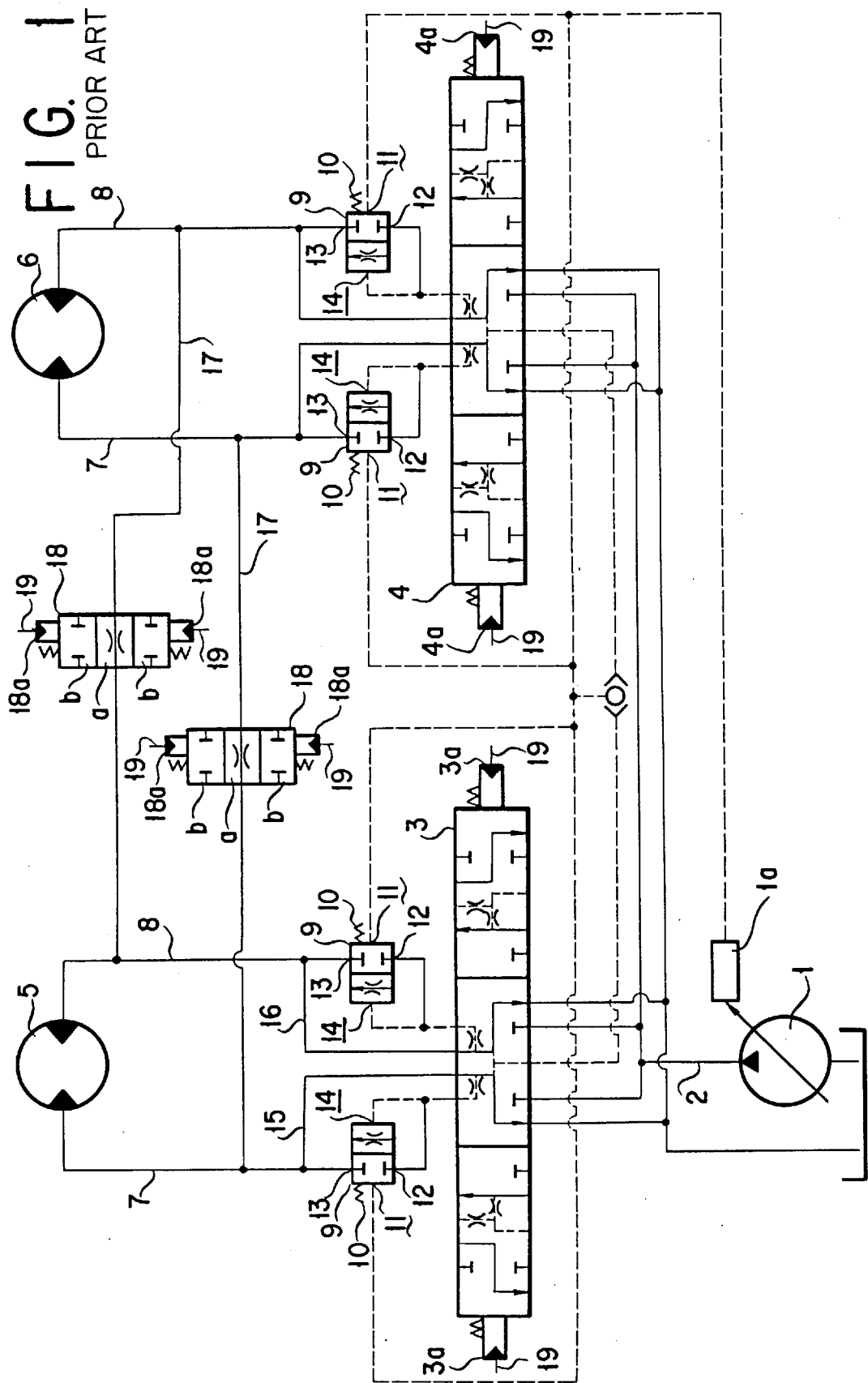
FIG. 1 is a circuit diagram of a prior art travelling control circuit of a hydraulically driven type of travelling apparatus.
Figure 2:
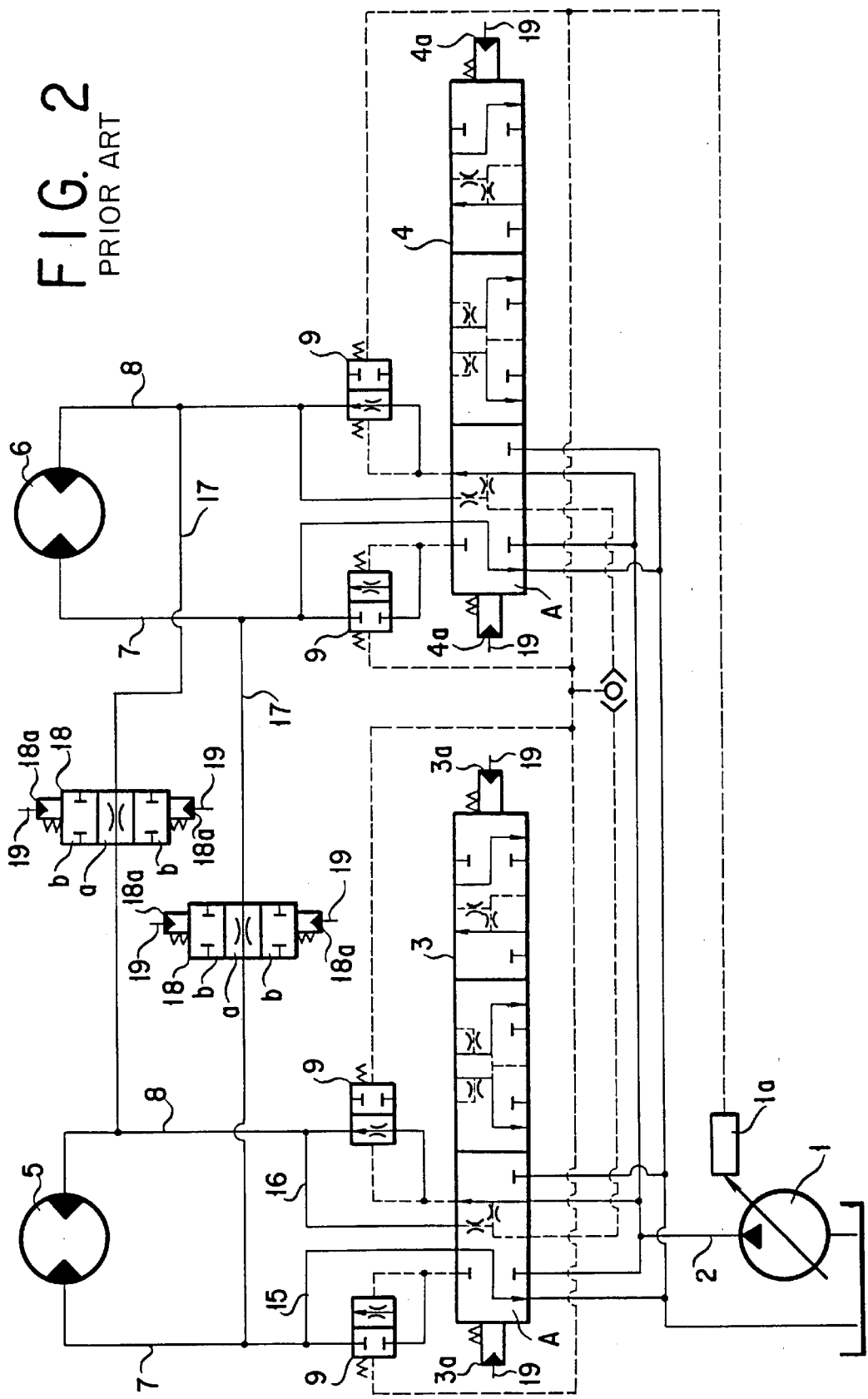
FIG. 2 is a diagrammatic view illustrating a status in which the apparatus is travelling linearly with the travelling control circuit of FIG. 1.
Figure 3:
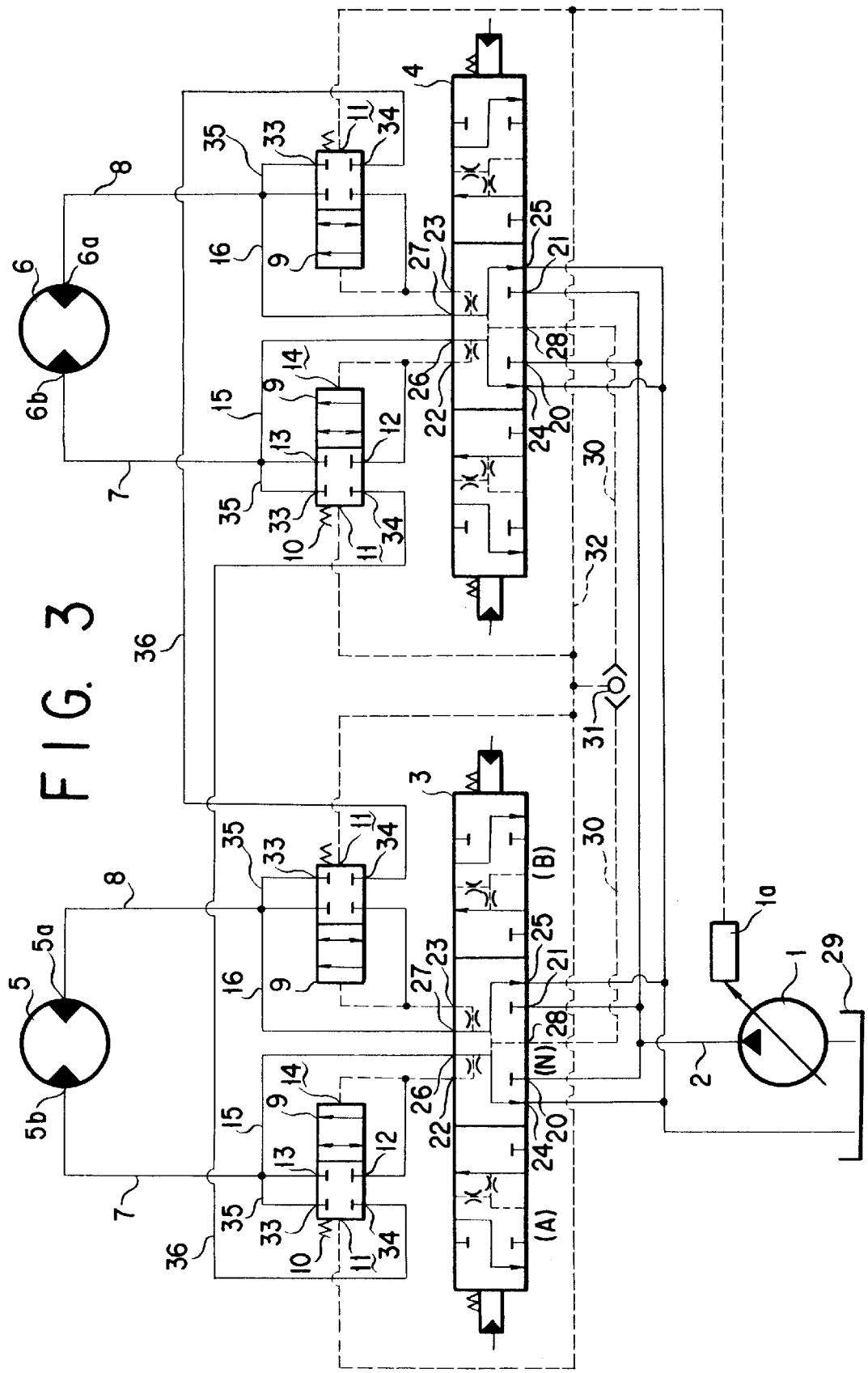
FIG. 3 is a diagrammatic view illustrating a preferred embodiment of a travelling control circuit of a hydraulically driven type of travelling apparatus, according to the present invention.

A detailed explanation will now be given of a preferred embodiment of the present invention with references to FIG. 3. The same components or members as in the prior art are designated by the same reference numerals.

A hydraulic pump 1 has a discharge path 2 that is connected to the respective inlet sides of a pair of left hand side and right hand side directional control valves 3 and 4 which are arranged in parallel to each other. The respective outlet sides of the directional control valves 3 and 4 are connected, via left and right hand side first circuits 7 and left and right hand side second circuits 8, to left and right hand side hydraulic motors 5 and 6, respectively. Each of the first circuits 7 and the second circuits 8 is provided with a pressure compensating valve 9, respectively.

The left hand side directional control valve 3 mentioned above is provided with a first and a second inlet port 20 and 21, a first and a second actuator port 22 and 23, a first and a second reservoir port 24 and 25, a first and a second return port 26 and 27, and a load pressure detecting port 28. The discharge path 2 of the hydraulic pump 1 is connected to the first and second inlet ports 20 and 21. The first and second circuits 7 and 8 are connected to the first and second actuator ports 22 and 23, respectively. The first and second reservoir ports 24 and 25 are connected to a reservoir 29. The first and second return ports 26 and 27 are connected to the first and second auxiliary ports 15 and 16, respectively. The load pressure detecting port 28 is connected to a load pressure detecting path 30.

When the above mentioned left hand side directional control valve 3 takes its neutral position N, the first and second inlet ports 20 and 21 are blocked from communication with the first and second actuator ports 22 and 23. Furthermore, communication will be established between each of the following: the first reservoir port 24 with the first return port 26, the first reservoir port 24 with the first actuator port 22 via a throttle, the second reservoir port 25 with the second return port 27, the second reservoir port 25 with the second actuator port 23 via throttle, and the load pressure detecting port 28 with the first and second reservoir ports 24 and 25.

When the left hand side directional control valve 3 takes its first position A, communication is blocked between the first inlet port 20 and the actuator port 22. In addition, communication will be established between each of the following: the second inlet port 21 with the second actuator port 23, the first reservoir port 24 with the first return port 26. Next, the second actuator port 23 and the second return port 27 will be placed in communication, each a throttle, with the load pressure detecting port 28. Finally, the second reservoir port 25 will be blocked.

When the left hand side directional control valve 3 takes its second position B, the first inlet port 20 will be allowed to communicate with the first actuator port 22. Further the first inlet port 20 will be placed in communication, via a throttle, with the first return port 26 and the load pressure detecting port 28. Next, the second return port 27 will be placed in communication with the second reservoir port 25. Finally, the second inlet port 21, the second actuator port 23 and the first reservoir port 24 will be blocked.

The right hand side directional control valve 4 is identical to that of the left hand side directional control valve 3.

The load pressure detecting circuit 30 that is connected to the load pressure detecting port 28 of the left and right hand side directional control valves 3 and 4 is connected via a high pressure priority valve 31 to the load pressure introducing path 32. In turn, the load pressure introducing path 32 is connected to the first pressure receiving portion 11 of each of the pressure compensating valves 9.

Each pressure compensating valve 9 mentioned above includes, apart from its inlet port 12 and its outlet port 13, a first port 33 and a second port 34. Each first port 33 is connected through a first path of communication 35 to the left or right side first circuits 7 or the left or right side second circuits 8, respectively. The second port 34 is connected through a second path of communication 36 to the other side of the first circuits 7. Furthermore, a path 36 also connects second ports 34 of pressure compensating valve 9 in the second circuits 8.

When the difference in pressure between the first pressure receiving portion and an actuator port is markedly increased to the extent that communication between the inlet port 12 and the outlet port 13 is blocked or substantially blocked, communication between the first port and the second port 34 will also be blocked. On the other hand, when the difference in pressure is so low that the inlet port 12 and the outlet port 13 are in communication with each other, a communication will also be established between the first port 33 and the second port 34. Thus, communication between the left hand side first circuit 7 and the right hand side first circuit 7 or between the left hand side second circuit 8 and the right hand side second circuit 8 will be established.

Stated otherwise, the pressure compensating valves 9 function not only to open and close the path of communication between the left hand side first circuit 7 and the right hand side first circuit 7 but also function to open and close the path of communication between the left hand side second circuit 8 and the right hand side second circuit 8. Thus, once communication is established between the inlet port 12 and the outlet port 13 of the pressure compensating valves 9 with the area of an opening that is not less than a predetermined value, the path of communication will be opened. On the other hand, once communication between the inlet port 12 and the outlet port 13 is blocked or substantially blocked, the path of communication will be closed.

Figure 4:
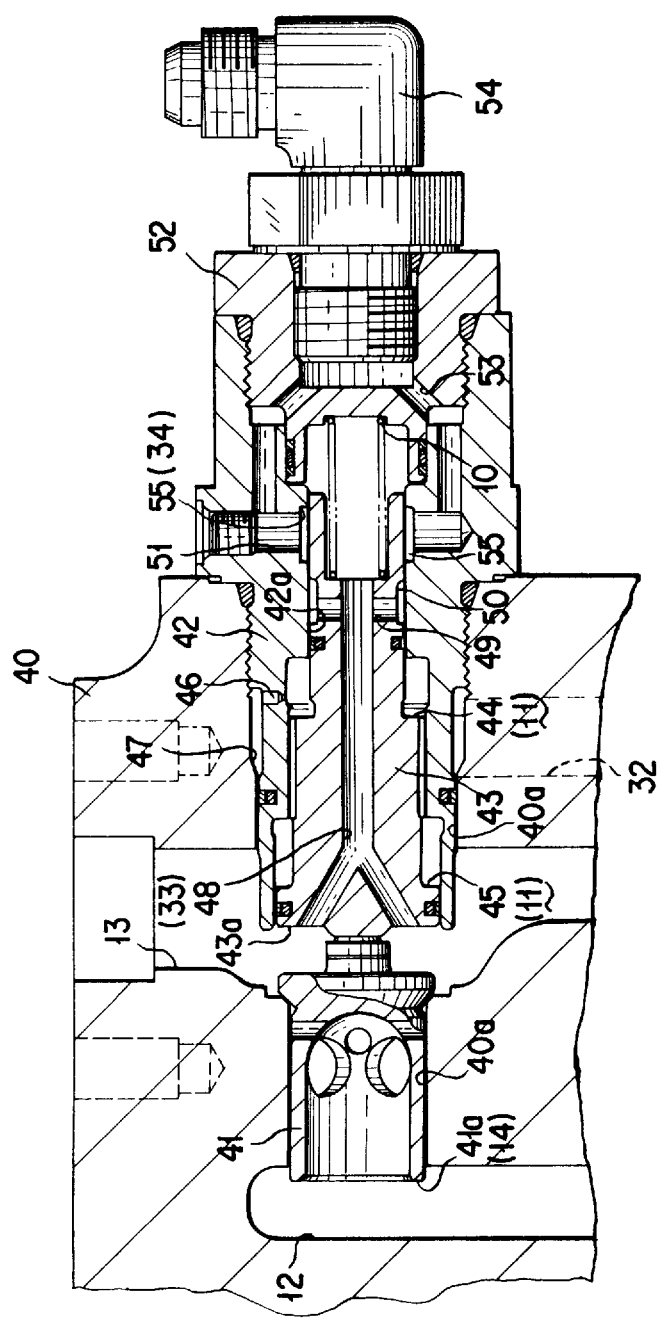
FIG. 4 is a detailed cross sectional view of a pressure compensating valve that can be used in the embodiment of FIG. 3.

An explanation will now be given with respect to a specific structure of a pressure compensating valve 9 with reference to FIGS. 4 and 5.

The pressure compensating valve 9 includes a valve body 40 which is formed with a bore 40a. The bore 40a has the inlet port 12, the outlet port 13 and a load pressure introducing port 47. At its left hand side, the bore 40a has a valve 41 slidably inserted which acts to establish and block communication between the inlet port 12 and the outlet port 13. At its other side, a sleeve 42 is inserted, in a threaded engagement, into the bore 40a. The sleeve 42 is in an opposing relationship with the valve 41. The sleeve 42 is provided with an inner circumferential surface 42a, a fine opening 46 that communicates with the load pressure introducing port 47, an annular recess 55 that is formed in the inner circumferential surface 42a, and a fluid bore 51. The fluid bore 51 has one end that communicates with an elbow 54 via a bore 53 of a spring bearing 52 which is screwed into the sleeve 42. The fluid bore 51 has another end that is open to the annular recess 55, thus constituting the second port 34. Into the sleeve 42, a piston 43 is slidably inserted in an opposing relationship with the above mentioned valve 41. The piston is adapted to be pushed unidirectionally by a spring 10 so as to thrust the valve in a blocking direction.

The above mentioned valve 41 has its end surface 41a open to the inlet port 12. As a pressure is applied to the second pressure receiving portion 14, valve 41 is pushed in the communicating direction (i.e., rightwards in FIG. 4) so as to place the inlet port 12 into communication with the outlet port. On the other hand, the piston 43 under a pressure applied to its first and second stepped portions 44 and 45 (i.e., the first pressure receiving portion 11) is pushed unidirectionally so as to thrust the valve 41 in its blocking direction, whereupon the valve 41 acts to block communication between the inlet port 12 and the outlet port 13. The first stepped portion 44 of the piston 43 will then communicate through the fine opening 46 of the sleeve 42 with the load pressure introducing port 47 of the valve body 40 to allow the load pressure introducing port 47 to be connected to a load pressure introducing path 32. As with a pressure fluid introduced into the first stepped portion 44 to act on the second stepped portion 45, the first and second stepped portions 44 and 45 will communicate with each other.

The above mentioned piston 43 is formed with an axial bore 48 through its center. The axial bore 48 has one end which is open to one end surface 43a, thus constituting the first port 33 that communicates with the outlet port 13. Therefore, the pressure fluid at the outlet port may be allowed to flow into the axial bore 48 through the first port 33. It will be noted that a portion of the axial bore 48 which is closer to the spring 10 is designed to communicate through radially extending bores 49 with an annular recess 50 that is formed in the outer peripheral portion of the piston 43. As shown in FIG. 4, when the valve 41 has been moved to take a position which blocks communication between the inlet port 12 and the outlet port 13, the piston 43 will also be displaced leftwards so as to block communication between the annular recess 50 and the annular recess 55. Hence communication between the first port 33 and the second port 34 is blocked.

Figure 5:
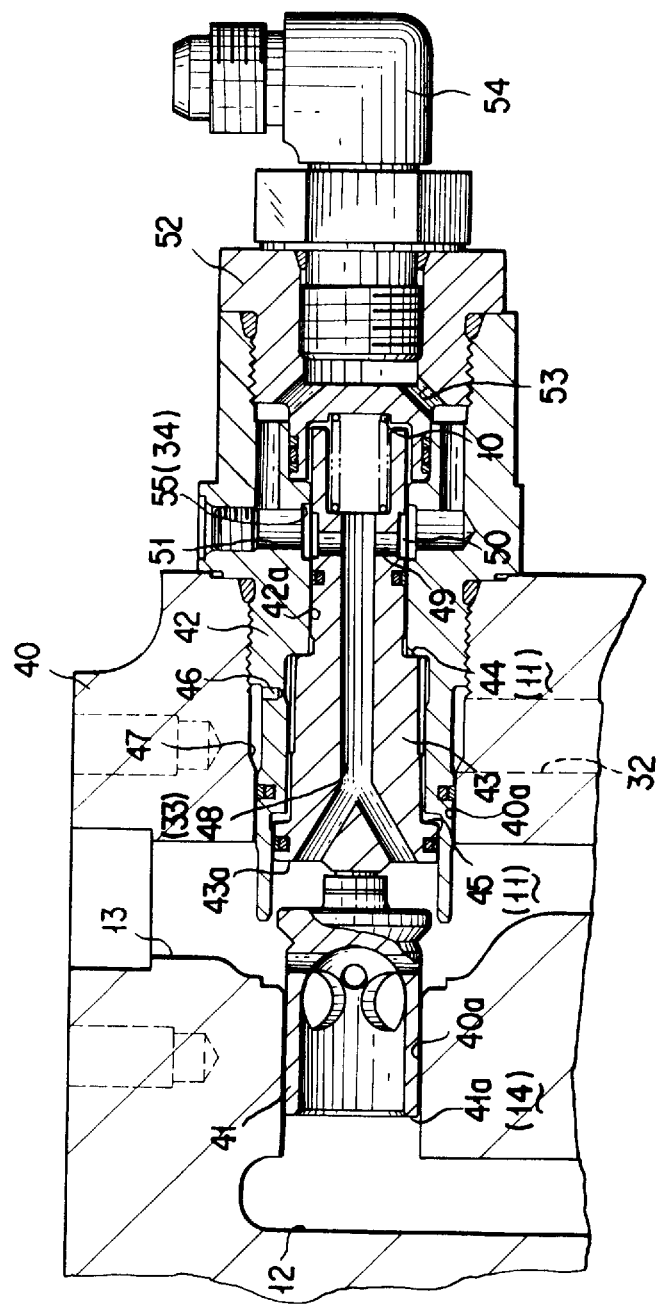
FIG. 5 is a detailed cross sectional view showing a state in which the compensating valve of FIG. 3 is being operated.

If the valve 41, as shown in FIG. 5, slides rightwards such as to establish communication between the inlet port 12 and the outlet port 13, the piston 43 will be pushed rightwards so as to place the annular recess 50 in communication with the annular recess 55. Hence communication is established between the first port 33 and the second port 34.

An explanation will next be given with respect to the operation of the preferred embodiment of the invention.

When the left and right hand side directional control valves 3 and 4 take the neutral position N, as shown in FIG.

3, the first and second inlet ports 20 and 21 are each blocked. In contrast, the first and second actuator ports 22 and 23, the first and second return ports 26 and 27, and the load pressure detecting port 28 are placed in communication with the reservoir 29, and their load pressures and the maximum load pressure in the load pressure introducing path 32 will be zero. Thus, each of the pressure compensating valves 9 will, by means of the spring 10, block communication between the inlet port 12 and the outlet port 13 and between the first port 33 and the second port 34. Hence, each of the left hand side and right hand side traveling purpose hydraulic motors 5 and 6 will be prevented from rotating.

Then, if the left hand side and right hand side directional control valves 3 and 4 take the first position A as shown in FIG. 6, the pressurized discharge fluid from the hydraulic pump 1 will pass through the second inlet ports 21, the second actuator ports 23, the pressure compensating valves 9 and the second circuits 8 to flow into the respective first ports 5a and 6a of the left hand side and right hand side travelling purpose hydraulic motors 5 and 6. The pressure fluid from the respective second ports 5b and 6b of these hydraulic motors will then be discharged through the first circuits 7, the auxiliary circuits 15, the first return ports 26 and the reservoir ports 24 into the reservoir 29.

The pressure acting on each of the second pressure receiving portions 14 of the respective pressure compensating valves 9 provided in the second circuits 8 will then become the maximum load pressure (i.e., the pressure at the load pressure introducing path 32) acting on each of the first pressure receiving portions 11. Thus, since the difference between this pressure and the self load pressure acts to control the area of the opening between the inlet port 12 and the outlet port 13, thereby compensating for a pressure at the inlet side, it will be appreciated that the single hydraulic pump 1 can be used to supply its discharge pressure fluid to the respective first ports 5a and 6a of the left and the right hand side traveling purpose hydraulic motors 5 and 6.

At the same time, since the first port 33 of a pressure compensating valve 9 provided in a second circuit 8 is allowed to communicate with its corresponding second port 34, communication will be established between the left hand side second circuit 8 and the right hand side second circuit 8. Thus, the ability to allow a vehicle to travel linearly is enhanced.

At this point it should be noted that if the left hand side and right hand side directional control valves 3 and 4 should each take the second position B as shown in FIG. 6, the result is simply the reversed rotation of the actuators 5, 6, and the operating principle is identical to that in which they take the first position A.

It should further be noted that in a pressure compensating valve 9 as mentioned above, it is also possible to construct the sleeve 42 integrally with the valve body 40.

As set forth in the foregoing description, communication can be established between the left hand side and right hand side first circuits 7 and between the left hand side and right hand side second circuits 8 by virtue of the open valve state of a pressure compensating valve 9 that is provided in either of the first circuits 7 and the second circuits 8. It is also apparent that communication may be established when a left hand side travelling purpose hydraulic motor 5 and a right hand side traveling purpose hydraulic motor 6 are to be supplied with a pressurized fluid in order for the travelling apparatus to travel linearly. It follows, therefore, that a linear path of travel of the apparatus can be enhanced owing to the provision of a pressure compensating valve 9.

Accordingly, it is apparent that since a pair of travelling purpose valves of communication are unnecessary, the cost of the apparatus will be reduced. In addition, since a circuit tailored for a pilot pressure fluid is also unnecessary, the circuit system itself is simplified.

While the present invention has been described with respect to certain illustrative embodiments, it will readily be appreciated by a person skilled in the art to be obvious that many alterations, omissions and additions can be made without departing from the essence and the scope of the present invention. Accordingly, it should be understood that the present invention is not limited to the specific embodiments set out above, but includes all possible embodiments that can be made within the scope with respect to the features specifically set forth in the appended claims and encompasses all equivalents.

What is claimed is:

1. A control valve system, comprising:

a hydraulic pump having a discharge path;

a first directional control valve operably provided in said discharge path;

a second directional control valve operably provided in said discharge path in parallel with said first directional control valve;

a first circuit fluidically connected to said first directional control valve;

a second circuit fluidically connected to said first directional control valve;

a third circuit fluidically connected to said second directional control valve;

a fourth circuit fluidically connected to said second directional control valve;

a first motor fluidically connected to said first and said second circuits;

a second motor fluidically connected to said third and said fourth circuits;

a first pressure compensating valve operably provided in said first circuit;

a second pressure compensating valve operably provided in said second circuit;

a third pressure compensating valve operably provided in said third circuit;

a fourth pressure compensating valve operably provided in said fourth circuit;

a first path of communication connecting said first pressure compensating valve to said third pressure compensating valve;

a second path of communication connecting said second pressure compensating valve to said fourth pressure compensating valve;

wherein said first and said third pressure compensating valves are adapted to connect said first path of communication with said first and said third circuits when said first and said third pressure compensating valves open communication in said first and said third circuits, and to disconnect said first path of communication from one of said first and third circuits when one of said first and said third pressure compensating valves blocks communication in said first and said third circuits, respectively; and wherein said second and said fourth pressure compensating valves are adapted to connect said second path of communication with said second and said fourth circuits when said second and said fourth pressure compensating valves open communication in said second and said fourth circuits, and to disconnect said second path of communication from one of said second and said fourth circuits when one of said second and said fourth pressure compensating valves blocks communication in said second and said fourth circuits, respectively.

2. The control valve system of claim 1, wherein:

said first and said second directional control valves each have a first and a second position;

said first pressure compensating valve has a load pressure introducing port which is fluidically connected to said second circuit, via a load pressure introducing path and a load pressure detecting circuit, when said first directional control valve takes said first position, and is fluidically connected to said first circuit, via a load pressure introducing path and a load pressure detecting circuit, when said first directional control valve takes said second position;

said second pressure compensating valve has a load pressure introducing port which is fluidically connected to said second circuit, via a load pressure introducing path and a load pressure detecting circuit, when said first directional control valve takes said first position, and is fluidically connected to said first circuit, via a load pressure introducing path and a load pressure detecting circuit, when said first directional control valve takes said second position;

said third pressure compensating valve has a load pressure introducing port which is fluidically connected to said fourth circuit, via a load pressure introducing path and a load pressure detecting circuit, when said second directional control valve takes said first position, and is fluidically connected to said third circuit, via a load pressure introducing path and a load pressure detecting circuit, when said second directional control valve takes said second position; and said fourth pressure compensating valve has a load pressure introducing port which is fluidically connected to said fourth circuit, via a load pressure introducing path and a load pressure detecting circuit, when said second directional control valve takes said first position, and is fluidically connected to said third circuit, via a load pressure introducing path and a load pressure detecting circuit, when said second directional control valve takes said second position.

3. The control valve system of claim 1, wherein said pressure compensating valves comprise:

a valve body having a bore formed therein, an inlet port fluidically connected to said bore, an outlet port fluidically connected to said bore, a first port fluidically connected to said bore, a load pressure introducing port fluidically connected to said bore, and a second port fluidically connected to said bore;

wherein a valve is slidably provided in said bore to control communication between said inlet port and said outlet port by moving in response to a pressure applied at said inlet port;

wherein a spring is provided in said bore; and wherein a piston is slidably provided in said bore, abutting said spring, to block communication between said first port and said second port by moving in a first direction in response to another pressure applied at said load pressure introducing port and a force applied by said spring, and to open communication between said first port and said second port by moving a predetermined distance in a second direction in response to another force applied by said valve.

4. The control valve system of claim 3, wherein said piston comprises:

a passage formed therein to establish communication between said first port and said second port.

5. The control valve system of claim 1, wherein said pressure compensating valves further comprise:

a valve body having an inlet port, a load pressure introducing port, a first port, an outlet port fluidically connected to said inlet port, and a second port fluidically connected to said first port;

said pressure compensating valves being movable between an open position which opens communication between said inlet port and said outlet port and between said first port and said second port and a closed position which closes communication between said inlet port and said outlet port and between said first port and said second port; and said pressure compensating valves take said closed position in response to a maximum load pressure applied from said load pressure introducing port and said open position in response to a self load pressure applied from said inlet port.

6. The control valve system of claim 5, wherein:

said inlet port and said outlet port of said first pressure compensating valve are fluidically connected to said first circuit;

said inlet port and said outlet port of said second pressure compensating valve are fluidically connected to said second circuit;

said inlet port and said outlet port of said third pressure compensating valve are fluidically connected to said third circuit;

said inlet port and said outlet port of said fourth pressure compensating valve are fluidically connected to said fourth circuit;

said second port of said first pressure compensating valve and said second port of said third pressure compensating valve are fluidically connected to said first path of communication;

said second port of said second pressure compensating valve and said second port of said fourth pressure compensating valve are fluidically connected to said second path of communication;

said first port of said first pressure compensating valve and said first port of said second pressure compensating valve are fluidically connected to said first directional control valve; and said first port of said third pressure compensating valve and said first port of said fourth pressure compensating valve are fluidically connected to said second directional control valve.

7. A travelling control circuit for a hydraulically driven travelling apparatus, comprising:

a hydraulic pump having a discharge path;

a first directional control valve operably provided in said discharge path and having an output side;

a second directional control valve operably provided in said discharge path in parallel with said first directional control valve and having an output side;

a first circuit fluidically connected to said output side of said first directional control valve;

a second circuit fluidically connected to said output side of said first directional control valve;

a third circuit fluidically connected to said output side of said second directional control valve;

a fourth circuit fluidically connected to said output side of said second directional control valve;

a first motor fluidically connected to said first and said second circuits;

a second motor fluidically connected to said third and said fourth circuits;

a first pressure compensating valve operably provided in said first circuit, having an inlet port fluidically connected to said first circuit, and an outlet port fluidically connected to said first circuit;

a second pressure compensating valve operably provided in said second circuit, having an inlet port fluidically connected to said second circuit, and an outlet port fluidically connected to said second circuit;

a third pressure compensating valve operably provided in said third circuit, having an inlet port fluidically connected to said third circuit, and an outlet port fluidically connected to said third circuit;

a fourth pressure compensating valve operably provided in said fourth circuit, having an inlet port fluidically connected to said first circuit, and an outlet port fluidically connected to said first circuit;

a first path of communication connecting said first pressure compensating valve to said third pressure compensating valve;

a second path of communication connecting said second pressure compensating valve to said fourth pressure compensating valve;

wherein said first and said third pressure compensating valves are adapted to connect said first path of communication with said first and third circuits when said first and said third pressure compensating valves open communication in said first and said third circuits, and to disconnect said first path of communication from one of said first and third circuits when one of said first and said third pressure compensating valves blocks communication in said first and said third circuits, respectively; and wherein said second and said fourth pressure compensating valves are adapted to connect said second path of communication with said second and said fourth circuits when said second and said fourth pressure compensating valves open communication in said second and said fourth circuits, and to disconnect said second path of communication from one of said second and said fourth circuits when one of said second and said fourth pressure compensating valves blocks communication in said second and said fourth circuits, respectively.

8. The travelling control circuit for a hydraulically driven travelling apparatus of claim 7, wherein said pressure compensating valves further comprise:

a valve body having a bore formed therein which is fluidically connected to said inlet port and said outlet port, said valve body also having a first port fluidically connected to said bore, a load pressure introducing port fluidically connected to said bore, and a second port fluidically connected to said bore;

wherein a valve is slidably provided in said bore to control communication between said inlet port and said outlet port by moving in response to a pressure applied at said inlet port;

wherein a spring is provided in said bore; and wherein a piston is slidably provided in said bore, abutting said spring, to block communication between said first port and said second port by moving in a first direction in response to another pressure applied at said load pressure introducing port and to a force applied by said spring, and to open communication between said first port and said second port by moving a predetermined distance in a second direction in response to another force applied by said valve.

9. The travelling control circuit for a hydraulically driven travelling apparatus of claim 8, wherein said piston comprises:

a passage formed therein to establish communication between said first port and said second port.

\* \* \* \* \*